(12) United States Patent
Price et al.

(10) Patent No.: US 6,971,446 B2
(45) Date of Patent: Dec. 6, 2005

(54) INTELLIGENT VEHICLE AIR CONDITIONING CONTROL SYSTEM

(75) Inventors: Ralph D. Price, Fort Wayne, IN (US); Rodney A. Laukhuf, Haviland, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 881 days.

(21) Appl. No.: 09/789,896

(22) Filed: Feb. 21, 2001

(65) Prior Publication Data
US 2003/0172156 A1   Sep. 11, 2003

(51) Int. Cl.⁷ .......................... B60H 1/00; B60H 1/34; B60H 1/32; F25B 29/00
(52) U.S. Cl. .................. 165/203; 165/237; 165/202; 165/42; 165/43; 236/91 C; 236/49.3
(58) Field of Search ................. 165/202, 203, 165/42, 43, 237; 236/91 C, 49.3

(56) References Cited
U.S. PATENT DOCUMENTS
4,107,941 A    8/1978   Hamilton
4,382,463 A    5/1983   Ikebukuro
5,054,686 A   10/1991   Chuang
5,878,809 A    3/1999   Heinle FOREIGN PATENT DOCUMENTS
JP      61050823 A   *   3/1986   ............ B60H 1/32
JP      07156637 A   *   6/1995   ............ B60H 1/00

\* cited by examiner

Primary Examiner—John K. Ford
(74) Attorney, Agent, or Firm—Jeffrey P. Calfa; Dennis Kelly Sullivan; Susan L. Lukasik

(57) ABSTRACT

An air conditioning control system for controlling the air conditioning system of a vehicle. The air conditioning control system is capable of determining the occupancy status of various locations in the vehicle interior. The air conditioning control system alters the flow rate of conditioned air to various portions of the vehicle interior based at least partially upon the occupancy of those areas of the vehicle interior. The air conditioning control system delivers increased amounts of conditioned air to the occupied portions of the vehicle interior when the conditioned air is of a comfortable temperature. The air conditioning control system delivers decreased amounts of conditioned air to the occupied portions of the vehicle interior when the conditioned air is most likely to be of an uncomfortable temperature.

5 Claims, 3 Drawing Sheets

INTELLIGENT VEHICLE AIR CONDITIONING CONTROL SYSTEM

BACKGROUND OF THE INVENTION

This invention relates to an intelligent air conditioning control system for a vehicle. The present invention is an air conditioning control system for a vehicle, a method of operating the air conditioning system, and a computer program embodied in a computer readable medium for causing the air conditioning control system to operate according to the method of the present invention, The air conditioning control system of the present invention causes the air conditioning system of a vehicle to deliver different flow rates of conditioned air to various portions of the occupant cabin of the vehicle in order to improve occupant comfort and the efficiency of the air conditioning system. The distribution of flow rates of conditioned air within the occupant cabin is dependent upon the state of occupancy of various positions within the occupant cabin, and the temperature of the conditioned air or the elapsed time of operation of the air conditioning system.

RELATED ART

Conventional air conditioning systems for motor vehicles provide healed or cooled air to the occupant cabin of a vehicle in order to provide an environment inside the occupant cabin which is comfortable for the occupants. Most vehicle air conditioning systems direct conditioned air into the occupant cabin through a network of ducts which has a plurality of outlets exhausting conditioned air into the vehicle occupant cabin. These vehicle air conditioning systems typically have a plurality of shutters located within a plenum chamber of the air conditioning system and may additionally have shutters located adjacent the plurality of outlets of the air conditioning system. The shutters of the air conditioning system can be manipulated to control the flow rate of conditioned air through various ones of the plurality of outlets of the network of ducts. The manipulation of those shutters that are in the plenum chamber may be controlled manually by an occupant of the vehicle or in some cases automatically by an air conditioning controller. The manipulation of those shutters that are adjacent to the outlets of the air conditioning system has, in the past, only been controlled manually by an occupant of the vehicle. These shutters thus make it possible to tailor the flow rate of conditioned air to various areas of the occupant cabin and maximize the comfort of the occupants. In traditional air conditioning systems these shutters are operated manually by the occupants of the vehicle. U.S. Pat. No. 5,878,809 discloses an air conditioning system for a vehicle, which senses the location (s) of occupants in the vehicle's occupant cabin and automatically tailors the flow rate of conditioned air to various areas of the occupant cabin based on the location of occupants and other factors. The system disclosed in this patent maximizes the flow rate of conditioned air to the areas of the occupant cabin which are occupied. One problem with this system is that during a period following initiation of operation of the air conditioning system the conditioned air delivered to the occupied positions of the occupant cabin at an increased rate is often of an objectionable temperature. In other words, in the summer when the occupant cabin is too warm, and operation of the air conditioning system is initiated, the conditioned air delivered to the occupants at an increased rate is often temporarily objectionably warm. A similar situation often occurs in the winter when the conditioned air delivered by the air conditioning system is objectionably cold. To control the air conditioning system to maximize the flow rate of conditioned air to the occupied areas of the occupant cabin during this time period when the conditioned air is of an undesirable temperature could thus increase the discomfort of the occupants.

SUMMARY OF INVENTION

As a result, an object of the present invention is to provide an air conditioning control system which automatically causes the air conditioning system of a vehicle to maximize the flow rate of conditioned air to occupied areas of the occupant cabin 20 only when the conditioned air is most likely to be at a desirable temperature.

The present invention is an air conditioning control system 24 for a vehicle 25, a method of operating the air conditioning control system 24, and a computer executable program for causing operation of the air conditioning control system 24 in accordance with the method of operation of the invention. The air conditioning system 10, controlled by the air conditioning control system 24 of the present invention, has a network of ducts 11 with an inlet 12 and a plurality of outlets 13. The air conditioning system 10 has a blower 14 disposed in a position such that when it is in operation it creates a flow of air through the network of ducts 11. The air conditioning system 10 has one or both of a heating element 15 and a cooling element 16 disposed within the network of ducts 11. The heating element 15 and the cooling element 16 can be operated to heat or cool the air traveling through the network of ducts 11 to a desirable temperature. The air conditioning system 10 has a plurality of shutters 17 located within the network of ducts 11. Each one of the shutters 17, 17A through 17C shown, can be manipulated to any of a number of positions between a fully closed position, which prevents the flow of air through the shutter 17, and a fully open position, which allows virtually free flow of air through the shutter 17.

The air conditioning control system 24 of the present invention includes a number of sensors, actuators and other devices necessary to control the air conditioning system 10 in accordance with the method of the present invention. The air conditioning control system 24 includes a control module 18 that receives input from various sensors, switches and other devices. The air conditioning control system 24 also includes at least one occupancy sensor 19 for use in determining whether or each of a plurality of occupancy positions 21 of the occupant cabin 20 are occupied. The control module 18 is connected directly or indirectly to at least one occupancy sensor 19 and is thus supplied with signals which allow the control module 18 to discern whether or not each of the occupancy positions 21 are occupied. The air conditioning control system 24 also includes shutter actuators 22 for connecting to the shutters 17. When the shutter actuators 22 are installed with the vehicle's air conditioning system 10, they are operable to control the position of the shutters 17 and thus the flow rate of conditioned air through portions of the network of ducts 11 upstream of the shutters 17. The shutter actuators 22 are also connected directly or indirectly to the control module 18 and the control module 18 is thus able to control the position of the shutters 17. By individually controlling the position of the shutters 17, the control module 18 can control the flow rate of conditioned air to various portions of the occupant cabin 20 in accordance with the method of the present invention. The air conditioning control system 24 of the present invention further includes one or more temperature sensors 23. When the air conditioning control system 24 is installed with the air conditioning system 10 the temperature sensors 23 are positioned within the network of ducts 11 downstream of any heating element 15 or cooling element 16 which is present in the air conditioning system 10. The control module 18 is connected directly or indirectly to the one or more temperature sensors 23 and receives signals that can be correlated to a temperature of the air within the network of ducts 11.

A computer program, which is embodied in a computer readable medium, causes the control module 18 to operate the air conditioning system according to the algorithm of the method of operation of the present invention. The control module 18 controls the shutter actuators 22 of the air conditioning control system 24 in accordance with the method of this invention. According to the method of the present invention the air conditioning control system 24 delivers different flow rates of conditioned air to various portions of the occupant cabin 20. The air conditioning control system 24 determines the distribution of flow of conditioned air based upon such factor as the state of operation of the air conditioning system 10, inputs from the occupant sensors 19, and in the preferred embodiment inputs from the temperature sensors 23. The air conditioning control system 24, and the method of operation of the present invention, include means and steps for concentrating the flow of conditioned air to the occupants of the occupant cabin 20. According to the method of the present invention the air conditioning control system 24 only concentrates the flow of conditioned air to the occupied portions of the occupant cabin when it is most probable that the conditioned air is of a comfortable temperature.

It can thus be seen that the present invention accomplishes the object of automatically maximizing the flow rate of conditioned air to the occupied areas of the occupant cabin only when the conditioned air is most likely to be at a desirable temperature.

DRAWINGS

Other objects and advantages of the invention will become more apparent upon perusal of the detailed description thereof and upon inspection of the drawings in which.

DETAILS OF INVENTION

Figure 1:
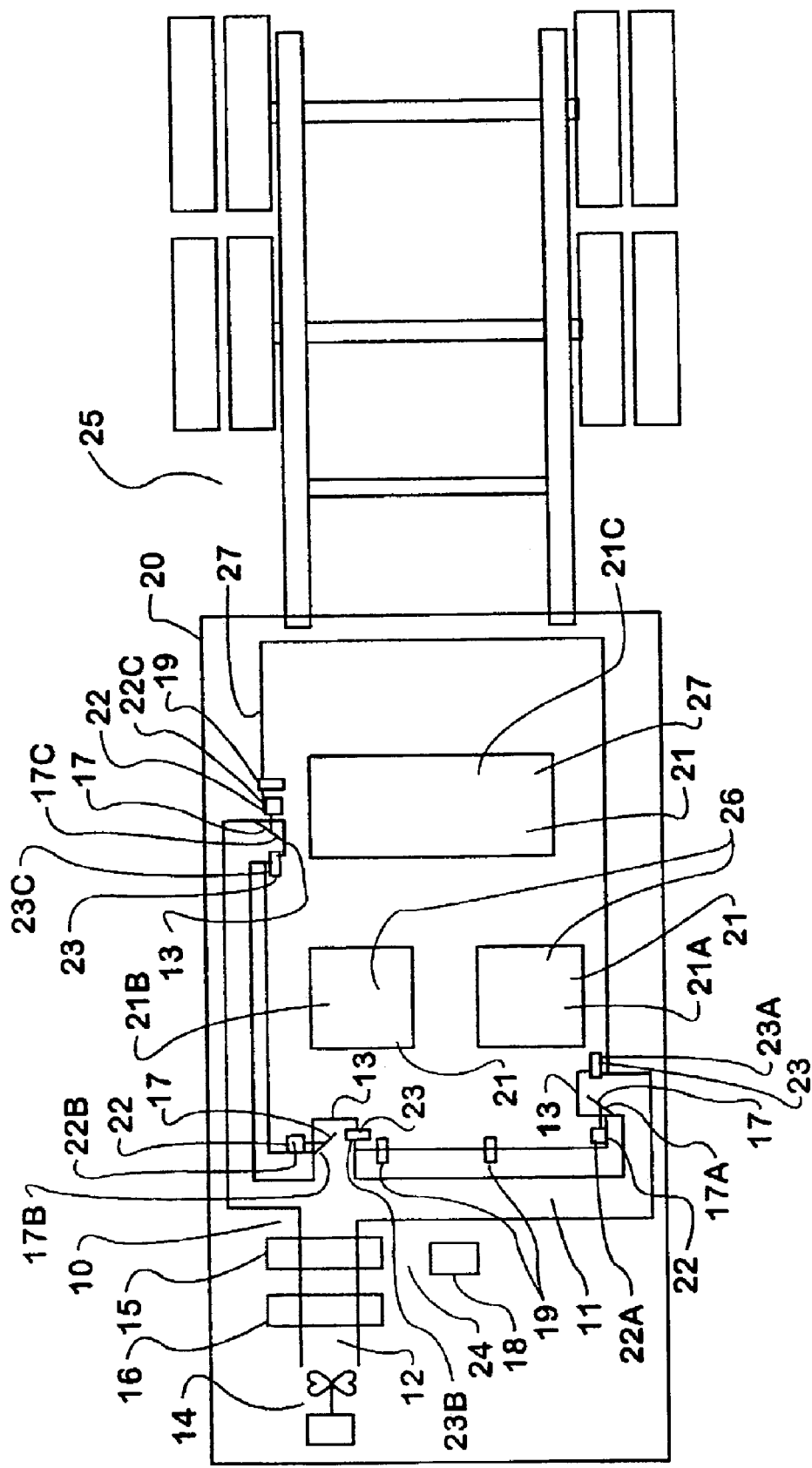
FIG. 1 is a plan view of a vehicle with an air conditioning system and an air conditioning control system according to the present invention.
Figure 2:
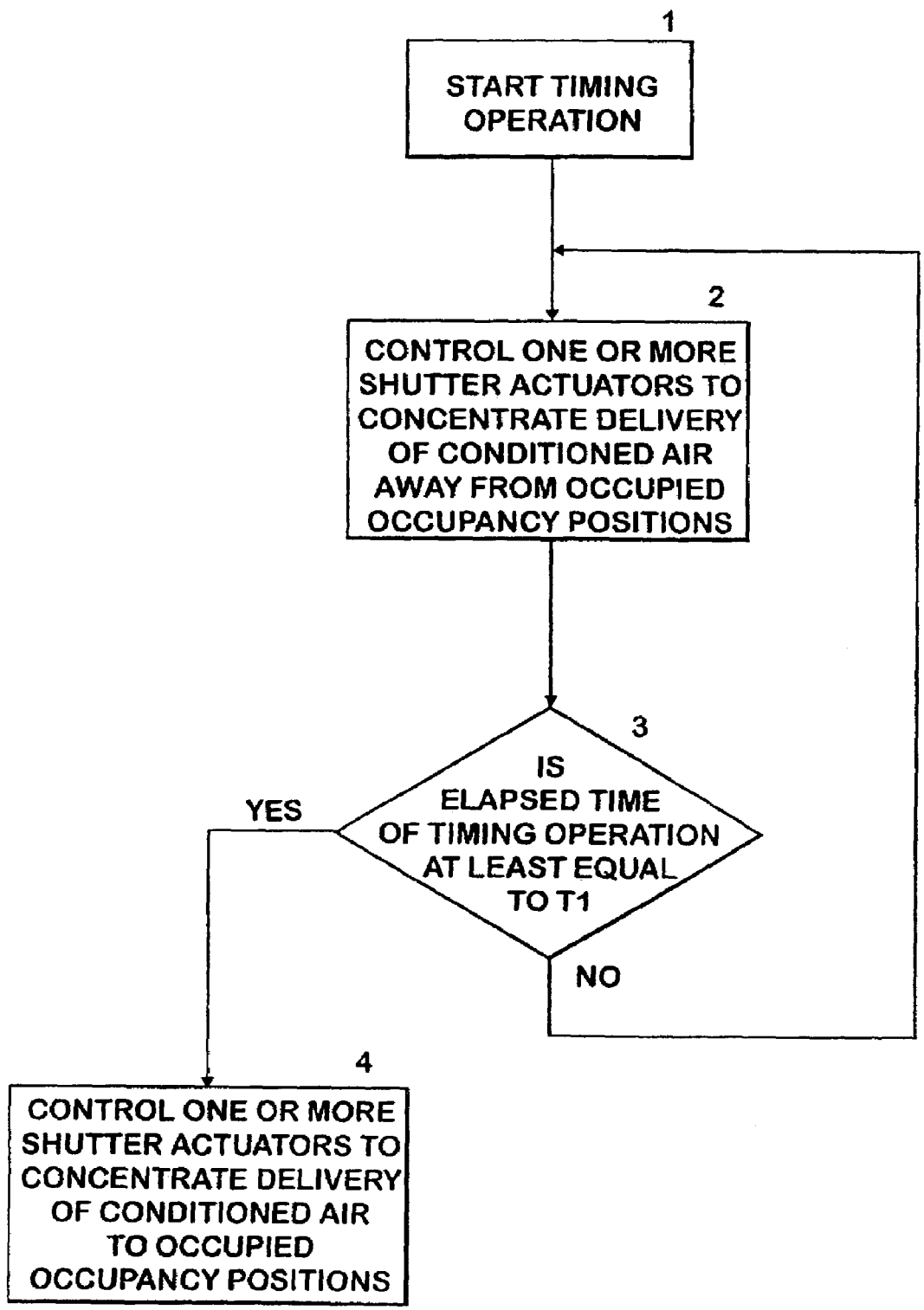
FIG. 2 is a flowchart demonstrating one potential embodiment of the time control method according to this invention.

The present invention is an air conditioning control system 24 for a vehicle 25, a method of operating the air conditioning control system 24, and a computer executable program for causing operation of the air conditioning control system 24 in accordance with the method of operation of the invention. There is shown in FIG. 1 an air conditioning system 10, an air conditioning control system 24, and a vehicle 25 in accordance with the present invention. The air conditioning system 10 has a network of ducts 11 with an inlet 12 and a plurality of outlets 13 at various positions of the periphery 28 of the occupant cabin 20. The air conditioning system 10 has a blower 14 positioned such that when the blower 14 is in operation it causes air flow through the network of ducts 11 in the direction from the inlet 12 toward the plurality of outlets 13. The air conditioning system 10 has one or both of a heating element 15 and a cooling element 16 disposed within the network of ducts 11. The heating element 15 and the cooling element 16 can be operated to heat or cool the air traveling through the network of ducts 11 to a desirable temperature. The air conditioning system 10 has a plurality of shutters 17, with shutters 17A through 17C shown, located within the network of ducts 11. Each of the plurality of shutters 17 can be individually and independently manipulated to any one of a number of positions between a fully closed position and a fully open position. The flow rate of conditioned air through each of the respective ones of the plurality of shutters 17 is increased as the position of the shutter is moved toward the fully open position. By manipulating each of the respective ones of the plurality of shutters 17 the flow rate of air through various branches of the network of ducts 11 can be controlled. Thus it is possible to deliver higher flow rates of conditioned air to some portions of the occupant cabin 20 than to other portions of the occupant cabin 20.

The air conditioning control system 24 of the present invention includes a number of sensors, actuators, and other devices necessary to control the air conditioning system 10 in accordance with the method of the present invention. The air conditioning control system 24 includes a control module 18 that receives input from various sensors, switches and other devices. The air conditioning control system 24 also includes at least one occupancy sensor 19 for use in determining whether or not at least one of a plurality of occupancy positions 21 of the occupant cabin 20 are occupied. The at least one occupancy sensors 19 may be any device capable of supplying signals directly or indirectly to the control module 18 which correlate to the state of occupancy of the respective occupancy positions 21. Some devices that would be suitable as occupancy sensors 19 include, but are not limited to, motion detectors, weight sensing means located in the seats 26 or the bunk 27 of the vehicle, and infrared sensors. In the preferred embodiment the one or more occupancy sensors 19 of the air conditioning control system 24 are comprised of one infrared sensor located in the vicinity of each respective occupancy position 21. If the signals supplied to the control module 18 by the occupancy sensor(s) 19 correlate to a spot temperature similar to the body temperature of a living being for a particular occupancy position 21 the control module 18 operates as if that particular occupancy position 21 is occupied. The control module 18 is connected directly or indirectly to the at least one occupancy sensor 19 and is thus supplied with signals which allow the control module 18 to discern whether or not various of the occupancy positions 21 are occupied. The air conditioning control system 24 also includes shutter actuators 22 for connecting to the shutters 17. When the shutter actuators 22 are installed with the vehicle's air conditioning system 10, they are operable to control the position of the shutters 17 and thus the flow rate of conditioned air through upstream portions of the network of ducts 11. The shutter actuators 22 are also connected directly or indirectly to the control module 18 and the control module 18 is thus able to control the position of the shutters 17. By controlling the position of the shutters 17, the control module 18 can control the flow rate of conditioned air to various portions of the occupant cabin 20 in accordance with the method of the present invention. For example, the air conditioning control system 24 can effect an increased flow rate of conditioned air to occupancy position 21A by controlling shutter actuator 22A to open shutter 17A. The air conditioning control system 24 could simultaneously control shutter actuators 22B and 22C to close shutters 17B and 17C and thus effect a decreased flow rate of conditioned air to occupancy positions 218 and 21C. One or more temperature sensors 23 may be disposed in the network of ducts 11 downstream of the heating element 15 and the cooling element 16. The control module 18 is connected directly or indirectly to the one or more temperature sensors 23 and receives signals that can be correlated to the temperature of the air within the network of ducts 11. In the preferred embodiment, the one or more temperature sensors 23 include(s) a temperature sensor for each occupancy position 21 of the occupant cabin 20. In this preferred embodiment, at least one of the one or more temperature sensors 23 is located near one of the plurality of outlets 13 in the vicinity of each of the respective occupancy positions 21. In the preferred embodiment, for example, the air conditioning control system 24 shown in FIG. 1 would have at least 3 temperature sensors, 23A, 23B, and 23C (one for each of the occupancy positions 21A, 21B, 21C) These are not labeled in the figures. In this embodiment, the temperature sensors, 23A, 23B, and 23C would be located respectively near the outlets 13A, 13B, and 13C of the network of ducts 11. By having at least one temperature sensor 23 for each respective occupancy position 21, the air conditioning control system 24 is better able to monitor the temperature of the conditioned air delivered to each occupancy position 21 of the vehicle 25. In the preferred embodiment, the control module 18 is also capable of determining the commanded or actual operational states ("on" or "off") of the blower 14, the heating element 15, and the cooling element 16.

The present invention also includes a computer readable medium having computer readable program code means embodied in said computer readable medium for causing the control module 18 to operate the air conditioning control system 24 of the present invention in accordance with the methods of the present invention. There are two potential methods of operation of the air conditioning control system of the present invention the algorithms for which may be embodied in the computer program of the present invention. The first method of operation of the present invention is the timed control method. The second method of operation of the present invention is the temperature control method.

The timed control method causes the air conditioning control system 24 to avoid concentrating the flow of conditioned air to the occupied portions of the occupant cabin 20 during times when the conditioned air is most likely to be at an objectionable temperature. If the control module 18 is operated according to the timed method of operation in accordance with the present invention it begins execution of the algorithm upon initiation of a heating or cooling mode of operation of the air conditioning system 10. At the initiation of the timed method of operation the air conditioning control system 24 starts a timing operation. The control module 18 then, dependent at least partially upon input from the at least one occupancy sensor 19 and the elapsed time of the timing operation, controls the shutter actuators 22 to deliver higher flow rates of conditioned air to some portions of the occupant cabin 20 than to other portions of the occupant cabin 20. The control module 18 may control the shutter actuators 22 according to a first set of operating guidelines until the elapsed time of the timing operation is at least equal to a predetermined period of time T1. While operating according to this first set of operational guidelines, the control module 18 controls the shutter actuators 22 dependent upon, among other things, input from the at least one occupancy sensor 19. The control module 18 may, after the elapsed time of the timing operation is at least equal to T1, control the shutter actuators 22 according to a second set of operational guidelines. While operating according to this second set of operational guidelines, the control module 18 controls the shutter actuators 22 dependent upon, among other things, input from the at least one occupancy sensor 19.

Figure 3:
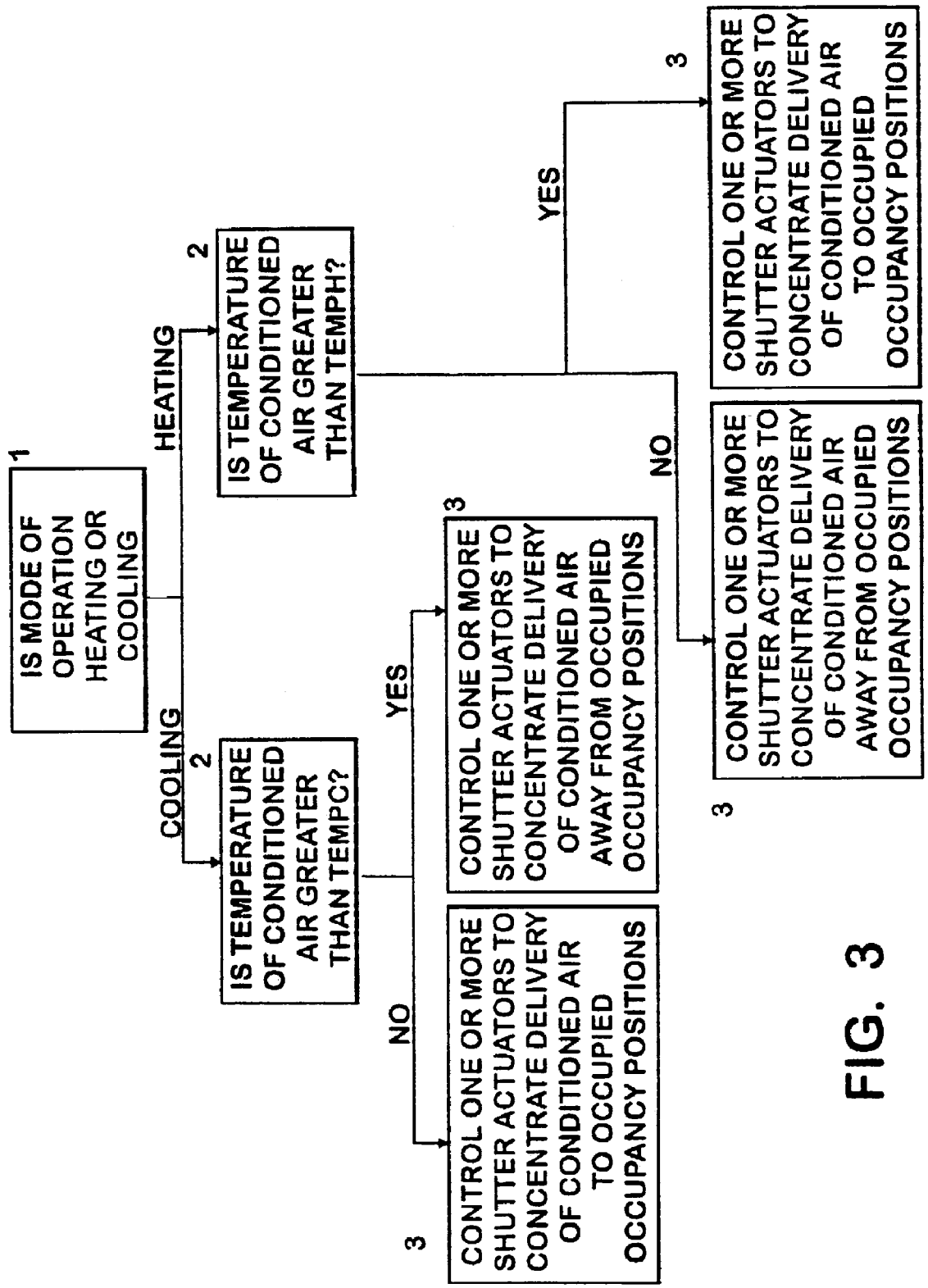
FIG. 3 is a flowchart demonstrating one potential embodiment of the temperature control method according to this invention.

There is shown in FIG. 3 a flow chart that outlines a more elaborate embodiment of the limed method of operation, which may be used. The control module 18 begins execution of the timed method of operation upon initiation of a heating or cooling mode of operation of the air conditioner system 10. At step 1 in the timed operation method the air conditioning control system 24 starts a timing operation. At step 2 the control module 18 controls the shutter actuators 22 of the air conditioning control system 24 to deliver a lessor flow rate of conditioned air to those occupancy positions 21 which are occupied than to those occupancy positions 21 which are unoccupied. The control module 18 then proceeds to step 3 and compares the elapsed time of the timing operation to T1. If the elapsed time of the timing operation is less than T1 the control module returns to step 2. If the elapsed time of the timing operation is at least equal to T1 the control module 18 proceeds to step 4. At step 4 the control module 18 controls the shutter actuators 22 to deliver a higher flow rate of conditioned air to those occupancy positions 21 which are occupied than to those occupancy positions 21 which are unoccupied. At any time during the timed method of operation the control module 18 may adjust the strategy of control for the plurality of shutter actuators 22 if the input signals received by the control module 18 from the at least one occupancy sensor 19 change. The control module 18 operates according to step 4 until operation of the air conditioning system 10 is terminated, at which time the control module 18 awaits subsequent initiation of operation of the air conditioning system 10 when it will begin the timed method algorithm again. The now chart shown in FIG. 3 is intended to be exemplary of only one of many possible specific embodiments of the timed control method. The steps shown in the flow chart of FIG. 3 could be performed in different orders or simultaneously. The important aspect of the timed control method is that the air conditioner control system 24 operates to deliver conditioned air away from the vehicle occupants during a period of time following the initiation of a heating or cooling mode of operation of the air conditioning system 10 and to thereafter concentrate the flow of conditioned air to the vehicle occupants. This method of operation avoids the problem of the air conditioning system 10 delivering conditioned air of (which is often of an uncomfortable temperature) to the occupants of the vehicle during start up of the air conditioning system 10. The method also allows for concentrated delivery of conditioned air to the occupants of the vehicle 25 after this initial start up period of the air conditioning system. The time settings are determined by empirical analysis and/or testing of the particular components and vehicle ducting and area and will vary depending on configuration.

The temperature control method is the second and preferred method of operation according to the present invention. As is the case with the time controlled method of operation the algorithm of the temperature control operation may be encoded in a computer program that is embodied in a computer readable medium. When operating according to the temperature control method the control module 18 effects a higher flow rate of conditioned air to some portions of the occupant cabin 20 than to other portions of the occupant cabin 20. The control module 18 ascertains whether or not each of the occupancy positions 21 are occupied based upon signals received from the at least one occupancy sensor 19. The control module 18 also ascertains the temperature of the conditioned air within the network of ducts 11 based upon signals received from the at least one temperature sensor 23. The distribution of flow rates of conditioned air to various portions of the occupant cabin 20 is dependent at least in part upon the inputs received by the control module 18 from the at least one occupancy sensor 19 and the at least one temperature sensor 23.

A flow chart outlining a more elaborate algorithm, which may be used for the temperature control method of operation, is shown in FIG. 4. The control module 18 would enter into the temperature control method of operation any time the air conditioning system 10 is operational. The control module 18 would begin the method of operation at step 1 where it determines whether the air conditioning system 10 is in a heating mode or a cooling mode. The control module 18 then proceeds to step 2. If at step 1 the control module 18 determines that the air conditioning system 10 is in a heating mode, at step 2 the control module 18 compares the temperature of the conditioned air within the network of ducts 11 to a predetermined temperature TEMPH. The control module 18 then proceeds to step 3. If at step 2 it was determined that the temperature of the conditioned air within the network of ducts 11 is higher than TEMPH, the control module 18 controls the shutter actuators 22 to concentrate the flow of conditioned air to the occupied occupancy positions 21 at step 3. If at step 2 it was determined that the temperature of the conditioned air within the network of ducts 11 is lower than TEMPH, the control module 18 operates the shutter actuators 22 to concentrate the flow of conditioned air away from the occupied occupancy positions 21 at step 3. As can be seen in FIG. 4 the control module 18 operates in a similar manner during steps 2 and 3 if it is determined at step 1 that the air conditioning system 10 is in a cooling mode. By operating according to the temperature control method the air conditioning control system 24 concentrates the flow of conditioned air to the areas of the occupant cabin 20 which are occupied, but only when the conditioned air is at a comfortable temperature. Thus, the temperature control method makes it possible to bring the occupied areas of the occupant cabin 20 to a comfortable temperature more quickly and efficiently. The temperature control method of the present invention further precludes the potential situation where occupant discomfort would be heightened if conditioned air of an uncomfortable temperature were delivered to the vicinity of the occupants at an accelerated rate.

Those skilled in the art will appreciate that modifications could be made to the invention as described without departing from the spirit and scope of the invention and thus the scope of the invention is limited only by the following claims.

We claim:

1. A vehicle, comprising:
   (a) a chassis;
   (b) a suspension attached to said chassis for supporting said chassis;
   (c) a power train engaged to said chassis for causing movement of said vehicle;
   (d) an occupant cabin engaged to said chassis for providing protection from the elements
   (e) for occupants of said vehicle and having a plurality of occupancy positions;
   (f) an air conditioning system mounted to said vehicle;
   (g) a control module;
   (h) a network of ducts, comprising a portion of said air conditioning system, which has an inlet and a plurality of outlets adjacent to an interior of said occupant cabin;
   (i) a blower, comprising a portion of said air conditioning system, for creating a flow of air through said network of ducts;
   (j) one or both of a heating element and a cooling element, which comprise a portion of said air conditioning system, which are disposed within said network of ducts;
   (k) one or more occupancy sensors mounted within said occupant cabin of said vehicle;
   (l) one or more temperature sensors mounted within an interior of said network of ducts of said air conditioning system of said vehicle;
   (m) one or more shutters, positioned within the path of flow of conditioned air through said network of ducts, for altering flow rates of conditioned air through various branches of said network of ducts and thus delivering a higher flow rate of conditioned air to various portions of said occupant cabin;
   (n) one or more shutter actuators attached to the one or more shutters of said air conditioning system of said vehicle;
   (o) wherein said one or more occupancy sensors are connected to said control module and said control module receives signals from said one or more occupancy sensors which correlate to the state of occupancy of said occupancy positions of said vehicle's occupant cabin;
   (p) wherein said one or more temperature sensors are connected to said control module and said control module receives signals from said one or more temperature sensors which correlate to a temperature of conditioned air within said network of ducts of said air conditioning system of said vehicle;
   (q) wherein each of said one or more shutter actuators are operable to manipulate the position of each respective shutter of said air conditioning system to which said shutter actuator is attached;
   (r) wherein each of said one or more shutter actuators are connected directly or indirectly to said control module and each of said shutter actuators are controlled by said control module to individually manipulate a position of a respective shutter to which said shutter actuator is attached;
   (s) an algorithm encoded computer program which is embodied in a computer readable medium which causes said control module to control said one or more shutter actuators, and thus flow rates of conditioned air to various portions of said occupant cabin, in a manner dependent at least partially upon said signals which said control module receives from said one or more occupancy sensors and said one or more temperature sensors;
   (t) said computer program more specifically causes said control module to perform the steps of:
      ascertaining based upon signals provided by said one or more occupancy sensors whether or not each respective one of said occupancy positions of said vehicle is occupied;
      ascertaining based upon signal provided by said one or more temperature sensors the temperature of conditioned air with said network of ducts of said air conditioning system;
      controlling each respective one of said one or more shutter actuators of said air conditioning system to provide higher flow rates of conditioned air to some portions of said occupant cabin than to other portions of said occupant cabin in a manner based at least partially upon signals received from said one or more temperature sensors and said one or more occupancy sensors;

determining if said air conditioning system is in a heating or cooling mode;

if said control module determines that said air conditioning system is in a heating mode and that conditioned air within said network of ducts is of a temperature lower than a first temperature TEMPH said control module controlling said one or more shutter actuators in a manner such that a higher flow rate of conditioned air is delivered to unoccupied ones of said occupancy positions than to occupied ones of said occupancy positions;

if said control module determines that said air conditioning system is in a heating mode and that conditioned air within said network of ducts is of a temperature higher than a first temperature TEMPH said control module controlling said one or more shutter actuators in a manner such that a higher flow rate of conditioned air is delivered to occupied ones of said occupancy positions than to unoccupied ones of said occupancy positions;

if said control module determines that said air conditioning system is in a cooling mode and that conditioned air within said network of ducts is of a temperature higher than a second temperature TEMPC said control module controlling said one or more shutter actuators in a mariner such that a higher flow rate of conditioned air is delivered to unoccupied ones of said occupancy positions than to occupied ones of said occupancy positions; and if said control module determines that said air conditioning system is in a cooling mode and that conditioned air within said network of ducts is of a temperature lower than a second temperature TEMPC said control module controlling said one or more shutter actuators in a manner such that a higher flow rate of conditioned air is delivered to occupied ones of said occupancy positions than to unoccupied ones of said occupancy positions.

2. The vehicle of claim 1, wherein:

said one or more occupancy sensors are infrared sensors, mounted in said occupant cabin, which provide signals to said control module which correlate to spot temperatures at each of said occupancy positions of said occupant cabin.

3. The vehicle of claim 2, wherein:

said computer program more specifically causes said control module to perform the steps of:

if said signals relayed to said control module from said infrared sensors correlate to a spot temperature for a particular occupancy position which is similar in magnitude to a normal body temperature of a living being said control module operates as if said particular occupancy position is occupied; and if said signals relayed to said control module from said infrared sensors correlate to a spot temperature for a particular occupancy position which is outside a range equivalent to a normal body temperature of a living being said control module operates as if said particular occupancy position is unoccupied.

4. The vehicle of claim 3, wherein:

for each respective occupancy positions one of said at least one temperature sensors is positioned near an end of a branch of said network of ducts which exhausts in an area near said respective occupancy position, such that temperatures of conditioned air delivered to each respective occupancy position can be known and control of said one or more shutters can be more appropriately performed.

5. The vehicle of claim 4, wherein:

said one or more occupancy sensors are comprised of one infrared occupancy sensor for each respective occupancy position of said occupant cabin; and each of said infrared occupancy sensors is located near each respective occupancy position of said occupant cabin.

* * * * *